(12) United States Patent
Flum

(10) Patent No.: US 8,110,734 B2
(45) Date of Patent: Feb. 7, 2012

(54) POSITION SENSITIVE ROTATABLE DJ CONTROL DEVICE

(75) Inventor: Alan Flum, Ridgefield, WA (US)

(73) Assignee: Gibson Guitar Corp., Nashville, TN (US)

( * ) Notice: Subject to any disclaimer, the term of this patent is extended or adjusted under 35 U.S.C. 154(b) by 717 days.

(21) Appl. No.: 12/218,419

(22) Filed: Jul. 15, 2008

(65) Prior Publication Data
US 2010/0014390 A1  Jan. 21, 2010

(51) Int. Cl.
*G10H 1/00* (2006.01)
*G10H 1/18* (2006.01)
*G10H 7/00* (2006.01)

(52) U.S. Cl. .......................................................... 84/615

(58) Field of Classification Search ................... 84/600, 84/615
See application file for complete search history.

(56) References Cited

U.S. PATENT DOCUMENTS

| | | | |
|---|---|---|---|
| 5,305,017 A | 4/1994 | Gerpheide | |
| 5,521,336 A | 5/1996 | Buchanan | |
| 6,576,825 B2 * | 6/2003 | Yamada et al. | 84/602 |
| 6,818,815 B2 * | 11/2004 | Cohen | 84/645 |
| 6,961,289 B2 | 11/2005 | Liu | |
| 7,010,371 B2 * | 3/2006 | Liu | 700/94 |
| 7,115,807 B2 | 10/2006 | Yamada | |
| 7,218,578 B2 * | 5/2007 | Usui | 369/30.27 |
| 7,238,874 B2 * | 7/2007 | Bastian | 84/612 |
| 7,683,249 B2 * | 3/2010 | Becker | 84/602 |
| 7,787,342 B2 * | 8/2010 | Yamada et al. | 369/53.37 |
| 7,889,605 B2 * | 2/2011 | Yamada et al. | 369/30.18 |
| 2002/0176327 A1 * | 11/2002 | Yamada et al. | 369/30.26 |
| 2003/0043701 A1 * | 3/2003 | Liu | 369/30.23 |
| 2005/0052981 A1 * | 3/2005 | Shim et al. | 369/59.26 |
| 2007/0234889 A1 | 10/2007 | Rotolo de Moraes | |
| 2007/0274181 A1 | 11/2007 | Yao | |
| 2008/0212437 A1 * | 9/2008 | Kataoka et al. | 369/53.41 |
| 2008/0273009 A1 * | 11/2008 | Goda et al. | 345/156 |
| 2009/0048694 A1 * | 2/2009 | Matsuda et al. | 700/94 |
| 2009/0223352 A1 * | 9/2009 | Matsuda et al. | 84/612 |
| 2009/0324192 A1 * | 12/2009 | Ogura et al. | 386/66 |

* cited by examiner

*Primary Examiner* — Jeffrey Donels
(74) *Attorney, Agent, or Firm* — Alan M. Flum; Stone Creek LLC

(57) ABSTRACT

The disclosure relates to a display for a device for manipulating audio in a disc jockey or similar application. A touch sensitive user rotatable member detects the position where the DJ touches the surface. Effects like needle dropping are possible for the first time without the use of a phonographic table or without a computer device which uses a phonographic turntable as a control input device. The display can show music as color coded concentric circles which represent tracks and/or record grooves. Color coded markers show current position of the music on the control surface and allows the user to set and use visual cue points. Functionality of the rotatable member can be dynamically mapped for unprecedented control. For example, the inner portion of the rotatable member can be used for needle dropping while the outer portion can be used for scratch effects. The device is capable of manipulating audio and video streams or a combination of the two. In addition, it can be used as a standard DJ control surface for scratching and the display can be used to create a beat synchronized light show or display custom messages.

30 Claims, 12 Drawing Sheets

POSITION SENSITIVE ROTATABLE DJ CONTROL DEVICE

BACKGROUND OF THE INVENTION

1. Field of the Invention

The present invention pertains to an integrated touch sensitive display into the surface of a DJ (disc jockey) jog wheel or rotatable member.

2. Description of the Prior Art

Phonographic turntables have traditionally been used by DJs to mix music and create special effects such as the well known scratch effect produced by moving the record back in forth in a fast rhythmic motion. Many DJs today use CD players or computers to mix their music. Since the DJ desires the same level of control that they had when mixing music on turntables, the CD players often have an integrated jog wheel or rotatable member that simulates the feel and effect of a vinyl record. Similarly, DJs that mix on computers often use a control surface that connects to their computer with an integrated jog wheel, or rotatable member that also simulates the feel and function of a vinyl record. The DJ turns the rotatable member 1, the turning motion 2, is interpreted by the software in the device or computer as a scratch effect. When the DJ touches the surface of the rotatable member 3, there is generally a mechanism that detects whether or not the surface of the member has been touched. However, the detector cannot detect the location that the surface of the member has been touched. Jog wheel or rotatable member control surfaces suffer from one major disadvantage compared to a traditional phonographic turntable. With a traditional phonographic turntable, or computer driven DJ software that uses a traditional phonographic turntable for control input, the disc jockey can instantly jump from one position of the music to another by simply lifting the tone arm and visually placing the needle in the desired position of the record. On the other hand, the upper surface of the jog wheel or rotatable member control surface is only capable of sending rotational information that the upper or side surfaces have been touched, not what position of the upper surface has been touched. This means that in order to jump from one position to another, which is known as "needle dropping" in traditional phonographic turntable vernacular, the DJ must use a separate set of controls, that are linked to a numeric display. With this combination, the DJ can also set what are called cue points. Cue points are positions that are stored in the memory of the device, that can be later returned to with the push of a button. However, there are no visual cues on the touch sensitive portion of the jog wheel or rotatable member surface. Again, referring to FIG. 1, when the surface of the rotatable member is touched by the DJ 3, the surface is only sensitive to whether or not it has been touched, it is not sensitive to where it has been touched. In some cases, the control separate sensors are positioned on the top and sides of the rotatable member in order to distinguish if the top or side has been touched. No matter which scheme is used, ultimately, the only information that existing jog wheel or rotatable member technology can send is rotational direction, rotational velocity, and possibly pressure, but not location of touch on the member surface.

Pioneer has integrated a display in the center of their non-motorized jog wheel or rotatable member (see U.S. Pat. No. 7,115,807 to Yamada, FIG. 2, element 4). The display has a pointer 5. This gives the user a rough idea of their position in the recording but does not correspond to a physical position on the jog wheel or rotatable member because the surface of the jog wheel or rotatable member can only detect whether it is touched, not where it is being touched. Different technologies have been implemented to detect touch/no-touch. These include switches and capacitive sensing. For example, see U.S. Pat. No. 6,961,289 to Liu.

FIG. 4 herein further illustrates a typical block diagram of prior art.

There are also devices which use an actual phonographic turntable as a control device. The turntable is connected to a computer through an external adapter. The turntable has a special LP record encoded with time code that is read by a conventional phonographic needle and cartridge. This control signal is converted to a digital signal through an external device and send to the computer. The computer is able to interpret direction and absolute position from this signal. The disadvantage of this solution is that the DJ must use a conventional turntable, an external audio sound card device and a special vinyl record and a computer.

Touch pad surfaces are well known as well as touch sensitive displays. For example, U.S. Pat. No. 5,521,336 to Buchanan describes a touch pad with a grid of non-intersecting flexible grid conductors. Resistive touch screens use two thin electrically conductive layers separated by a thin space. The upper layer is flexible as to make contact with the lower layer when touched. The voltage at contact point is measured and is used to determine the position. Other touch pads, such as those manufactured by Synaptics are capable of determining finger position by as little as 0.001 inches. Synaptics uses the capacitance between the finger and electrodes in the touch pad surface, separated by an insulator. The capacitance is measured in each electrode in two planes, from this they are able to determine exact position as disclosed in U.S. Pat. No. 5,305,017 to Gerpheide.

Other type of touch screen technologies use infrared sensors. They typically use an orthogonal array of image sensors to detect the interruption of the infrared light beams near the surface.

While the above prior art demonstrates that position sensing is widely known, it has never been used in combination with a rotatable DJ jog wheel or rotatable member in order to determine exact position on the member and correlate this to position in a musical or video performance.

U.S. Patent Application 2007/0234889 to Rotolo de Moraes suggests the use of multiple sensor under the jog wheel or rotatable member control to provide discrete regions of functionality. However, the functionality is limited to triggering discrete events because there is no way to sense the exact position of the wheel that has been touched, only the region.

Display feedback has been incorporated into DJ rotatable control devices. U.S. Patent Application 2007/0274181 to Yao discloses providing visual feedback through the use of blinking lights on the member surface. The above-identified Rotolo de Moraes reference also teaches visual feedback on a DJ control wheel through discrete LEDs mainly as a learning tool and to provide some type of scoring mechanism for competition. However, in both of the above mentioned references, the function of the display is limited in utility by the fact that only a fixed number of LEDs are provided.

OBJECTS AND SUMMARY OF THE INVENTION

It is therefore an object of the present invention to provide improved control and display for disc jockey jog wheels or rotatable members.

This and other objects are attained by the present disclosure which discloses both motorized and non-motorized DJ jog wheel or rotatable member control surfaces. The disclosed embodiments solve the above mentioned problems of CD players and digital controller jog wheel or rotatable member surfaces by conveying the exact position where the rotating member was touched. This allows the DJ to instantly "cue" or needle drop to an exact location in the music visually, but touching an exact position on the control surface. In another mode of operation, the DJ can touch a portion of the control surface to set cue points.

The disclosed embodiments also have several advantages over solutions that attempt to solve the needle dropping problem using a hybrid approach. The hybrid approach includes an actual phonographic turntable with a special time code record, connecting to a computer to achieve needle dropping. The disclosed embodiments can be used in a standalone DJ device that has a built in recording medium such as a DJ CD player, DJ hard disk based controller, or a DJ DVD player. It can also be used in a DJ controller that connects to a computer. Unlike the phonographic turntable with a special time code LP record, this controller can be a light weight and low cost jog wheel or rotatable member based device or a highly sophisticated DJ control surface.

In another embodiment, a touch sensitive display can be integrated onto the touchable portion of the rotating control surface. This embodiment has numerous advantages the prior art. A visual marker can be automatically or manually set when the DJ touches a certain position on the surface. This allows for a novel way of displaying cue points exactly where they occur in the music on the rotating member. Different cue points could be displayed in different colors. These colors could be visually linked to other displays either on the control surface or, if the control surface is linked to an external computer, in the computer's software. In addition, the touch sensitive display integrated into the control surface can provide other visual cues to the DJ. These include starting and ending points of tracks and track names.

The disclosed embodiments further have the ability to adjust how many songs would be mapped to the control surface. The DJ could map an entire album to the control surface or a single song. This gives the DJ unprecedented simultaneous tactile and visual control. Mapping an entire albums worth of music to the control surface simulates the tactile feel of a vinyl record. When mapping a single song, or portion of a song, the display can display beat and audio waveform information allowing the DJ to visually needle drop on a beat.

The various embodiments give disc jockeys (DJ) better control of their musical performances, because for the first time, they can use a jog wheel or rotatable member control surface for absolute position control. In addition, the integrated touch screen display is used to provide an unprecedented level of control. The screen can display music as color coded concentric circles which represent tracks or record grooves. Color coded markers show current position of the music on the control surface and allows the user to set and use visual cue points. Effects like needle dropping are possible for the first time without the use of a phonographic turntable or a computer device which uses a phonographic turntable as its control surface. Functionality of the rotatable member can be dynamically mapped for unprecedented control. For example, the inner portion of the rotatable member can be used for needle dropping while the outer portion can be used for scratch effects. Various embodiments are capable of manipulating audio and video streams or a combination of the two. In addition, it can be used as a standard DJ control surface for scratching and the display can be used to create a beat synchronized light show or display custom messages.

DESCRIPTION OF THE DRAWINGS

Further objects and advantages of the invention will become apparent from the following description and from the accompanying drawings, wherein.

DETAILED DESCRIPTION OF THE PREFERRED EMBODIMENT

Figure 1:
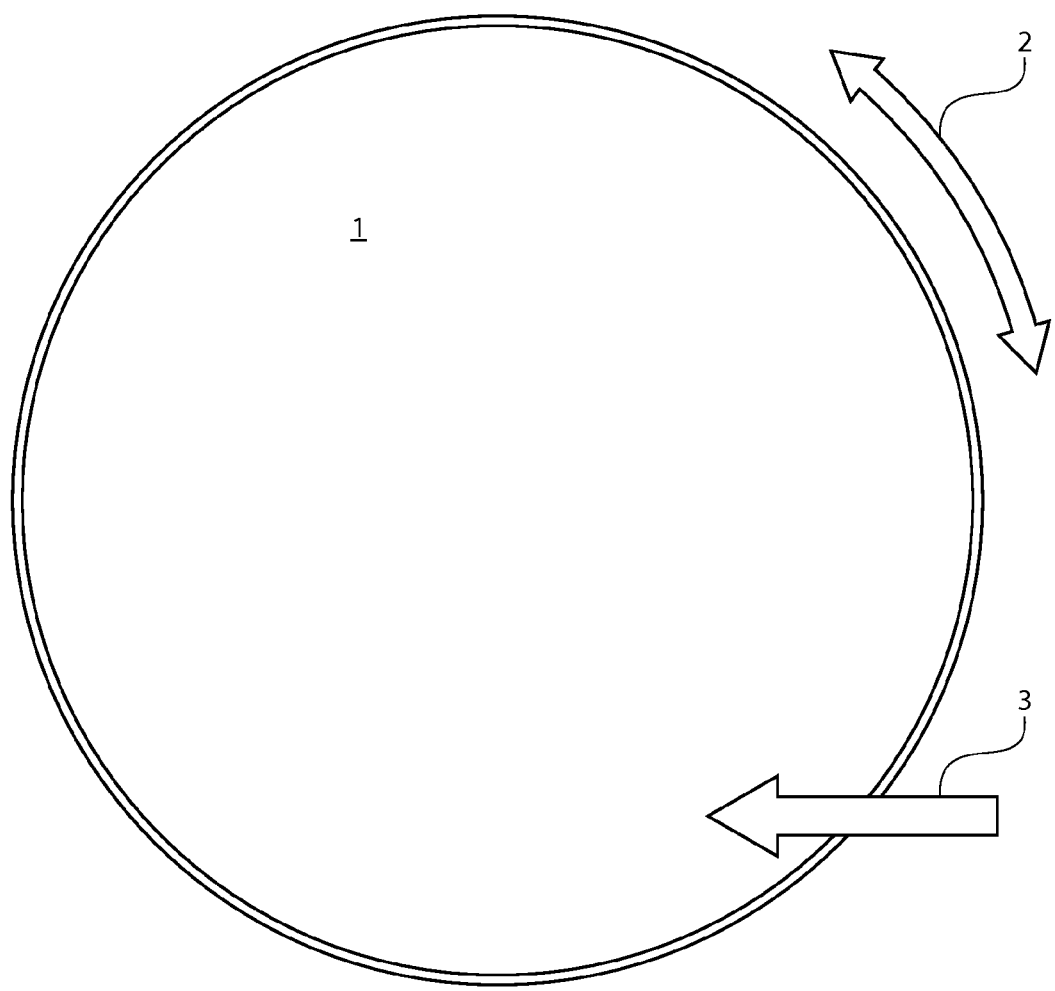
FIG. 1 is a plan view of a prior art rotatable member for a DJ audio playback device or DJ control surface.
Figure 2A:
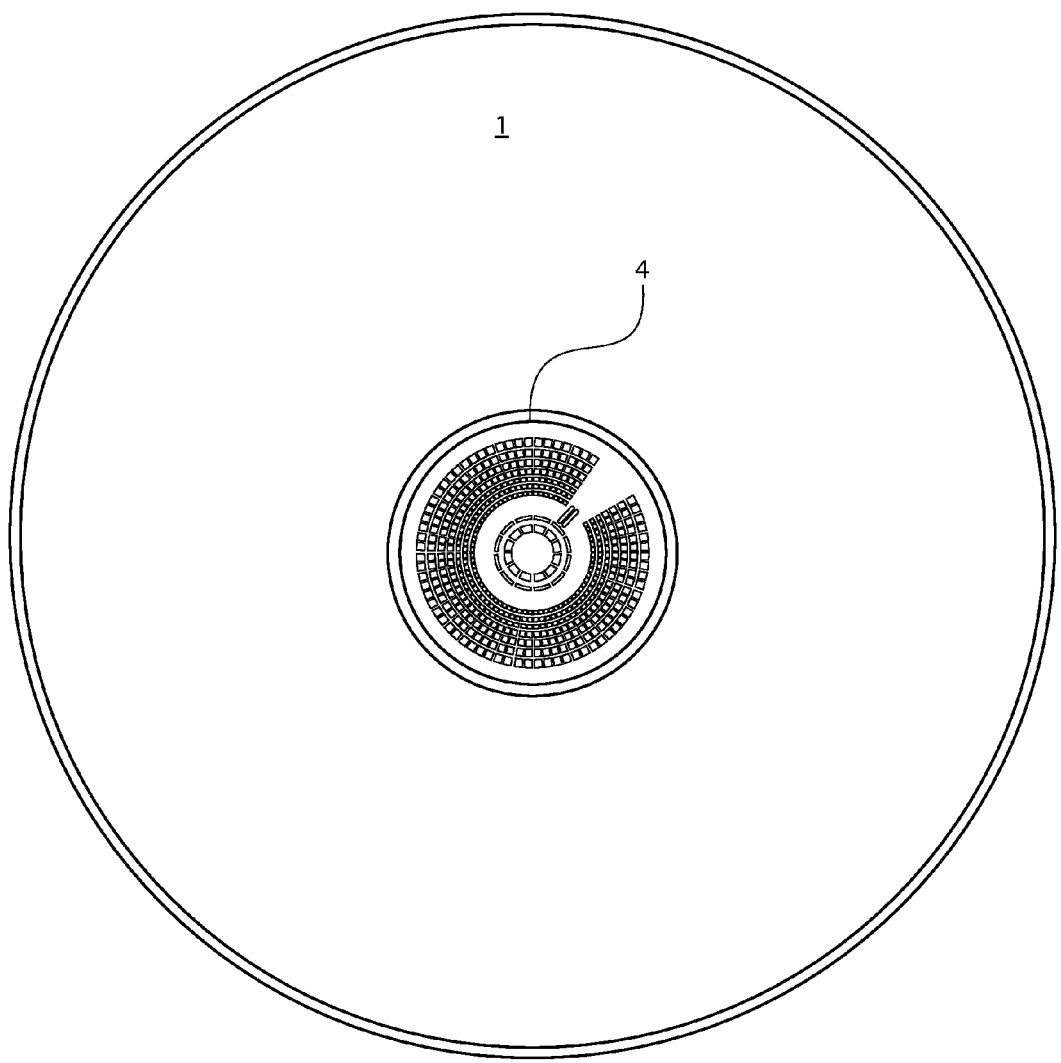
FIG. 2A is a plan view of a prior art rotatable member with a center display.
Figure 2B:
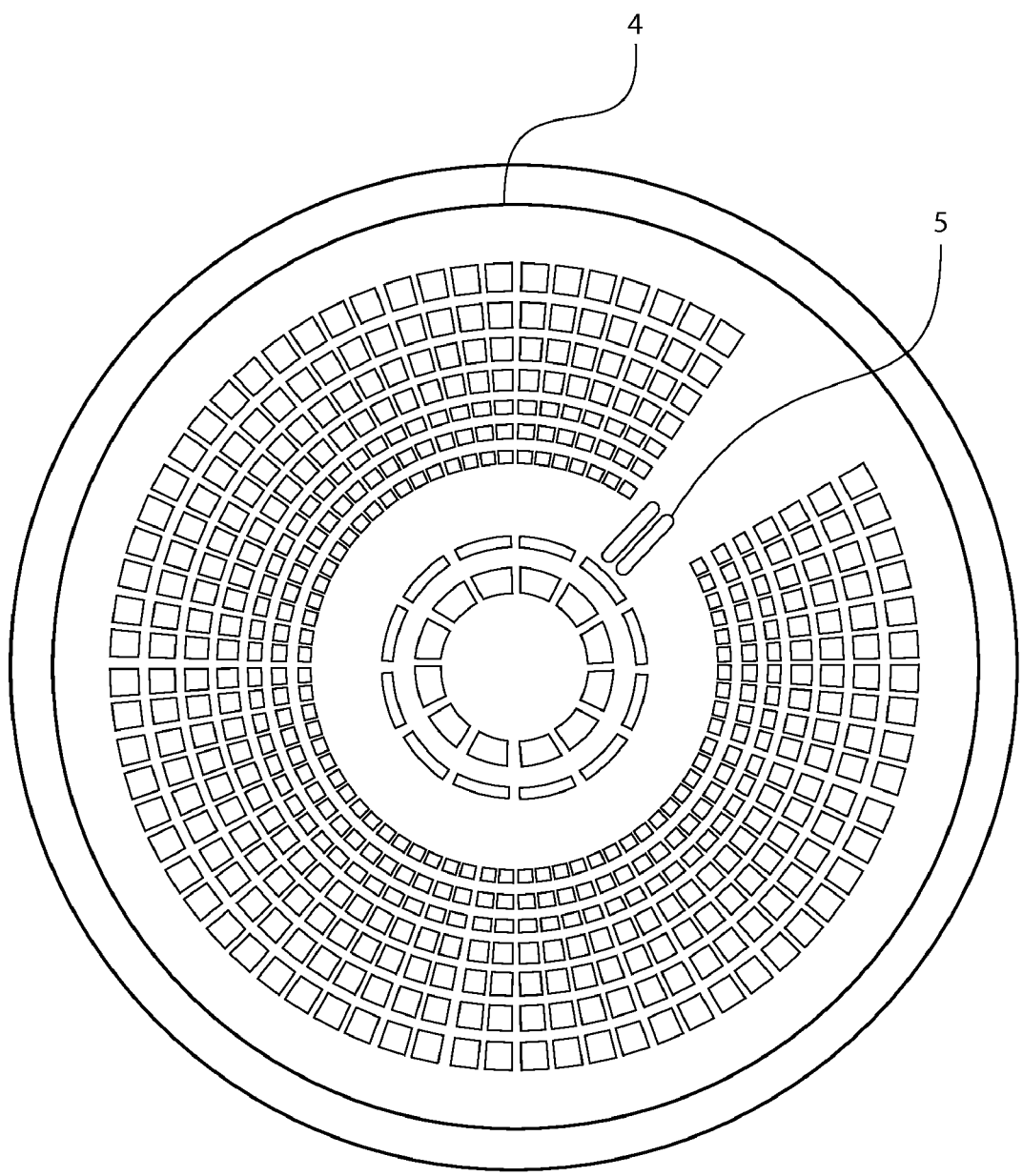
FIG. 2B is a detail of the center display of FIG. 2A.
Figure 3:
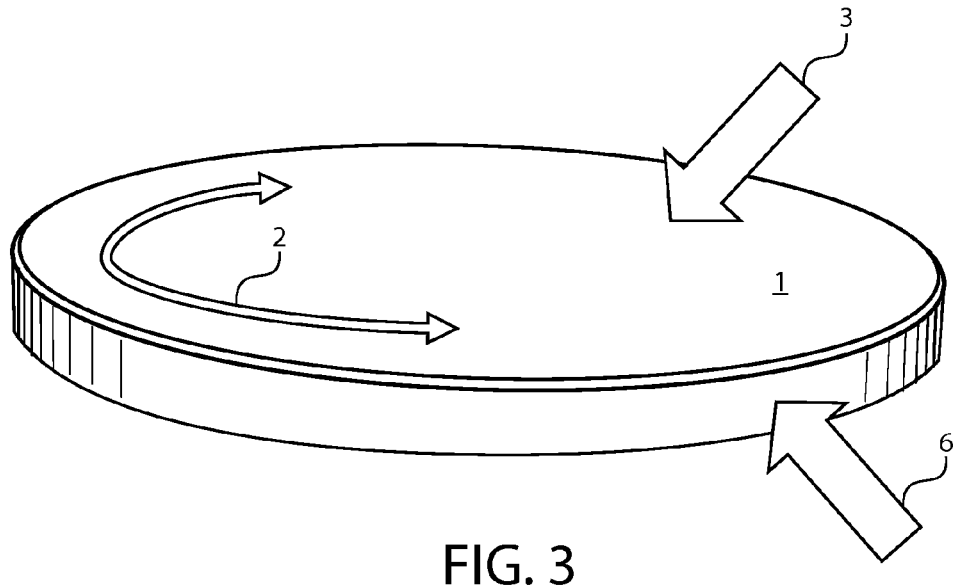
FIG. 3 is a perspective view of a rotatable member for a DJ audio playback device or DJ control surface of the prior art, configured as a jog wheel or rotatable member for disc jockeys.
Figure 4:
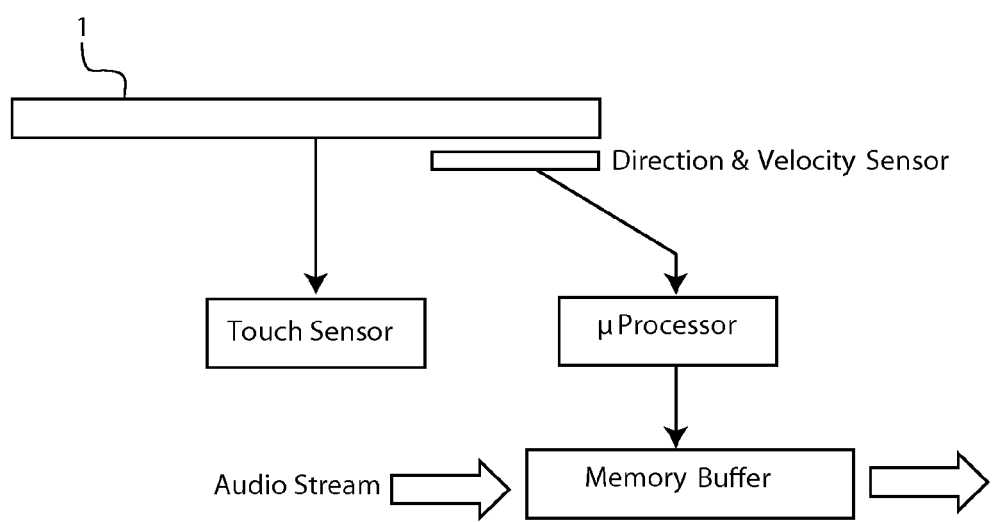
FIG. 4 is a typical block diagram of the implementation of a prior art rotatable member for a DJ audio playback device or DJ control surface, configured as a jog wheel or rotatable member for disc jockeys.
Figure 5:
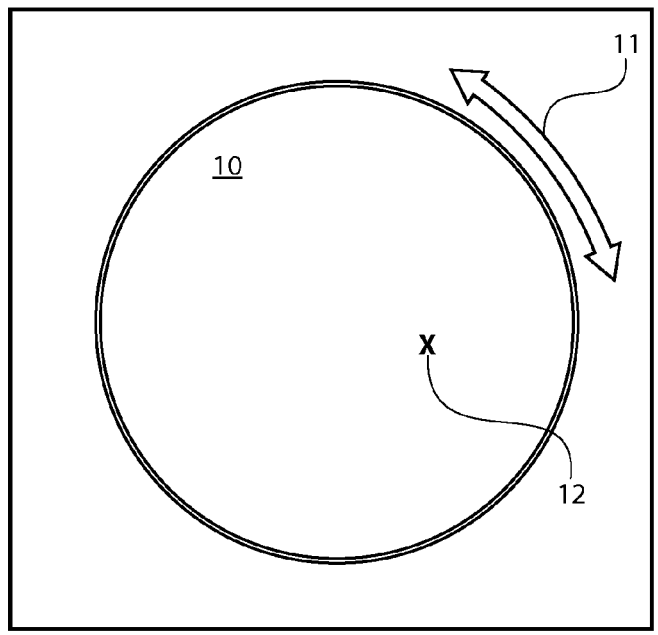
FIG. 5 is a plan view of a rotatable member for a DJ audio playback device or DJ control surface of an embodiment of the present invention with position detection in the needle drop mode.

Referring now to the drawings in detail, wherein like numerals indicate like elements throughout the several views, one sees that FIG. 5 illustrates the basic functions of an embodiment of the present invention. When the DJ touches the surface of the rotatable member 10 at point 12, the surface is able to detect the exact position of point 12 where it is touched. A capacitive array is typically used for this detection, but those skilled in the art will recognize a range of equivalents after review of this disclosure, such as, but not limited to, resistive sensing, infrared sensing, surface acoustic wave (SAW), acoustic pulse recognition, and frustrated total internal reflection. Furthermore, the disc jockey can manually rotate the rotatable member 11 which is interpreted by the software as a scratch motion with a resultant audio effect similar to that resulting from such a motion on a conventional turntable.

Figure 6:
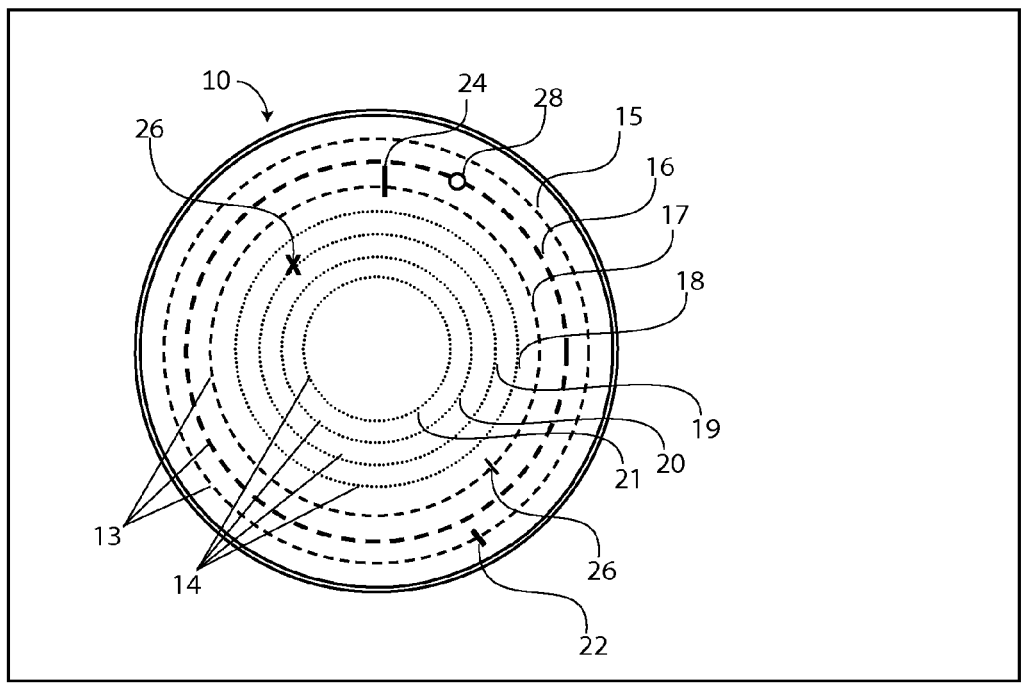
FIG. 6 is a plan view of a rotatable member for a DJ audio playback device or DJ control surface of an embodiment of the present invention, with a sensitive display embedded on the surface thereof.

Further detail is shown in FIG. 6 wherein the upper surface of rotatable member 10 is divided into tracks 13, 14, by successive color-coded circular grooves 15, 16, 17, 18, 19, 20, and 21. Each track represents a different song. Each track has a marked start point 22 and end point 24 (the start point and end point are illustrated for track 13 only, with the start point on an outer circumference of the track and the end point on an inner circumference of the track, as would be the configuration of a convention LP record). Additionally, cue points 26 are color-coded and the (simulated) current position of the music, as played by the CD player is shown color-coded at point 28. The position of the current music position will change dynamically as the song plays. Unlike implementations of non-touch sensitive central displays in prior art, the song pointer does not simply go around the circumference of the display, but changes groove position according to the music.

Figure 12:
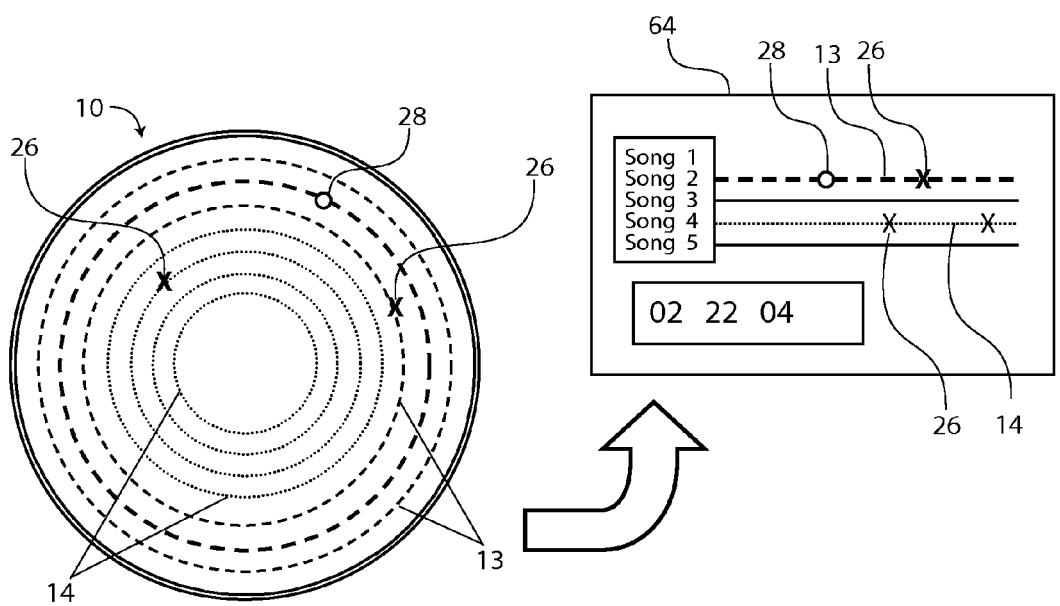
FIG. 12 is a plan view of a display information coded to screen information in an embodiment of the present invention.

All of the color information can be keyed to the same color and symbols on either an internal information display located on the unit or on an external computer display, if the unit is connected to a computer, as shown in FIG. 12.

Since the song information is dynamically mapped to portions of the control surface, with an integrated touch screen display, other functionality is possible.

Figure 7:
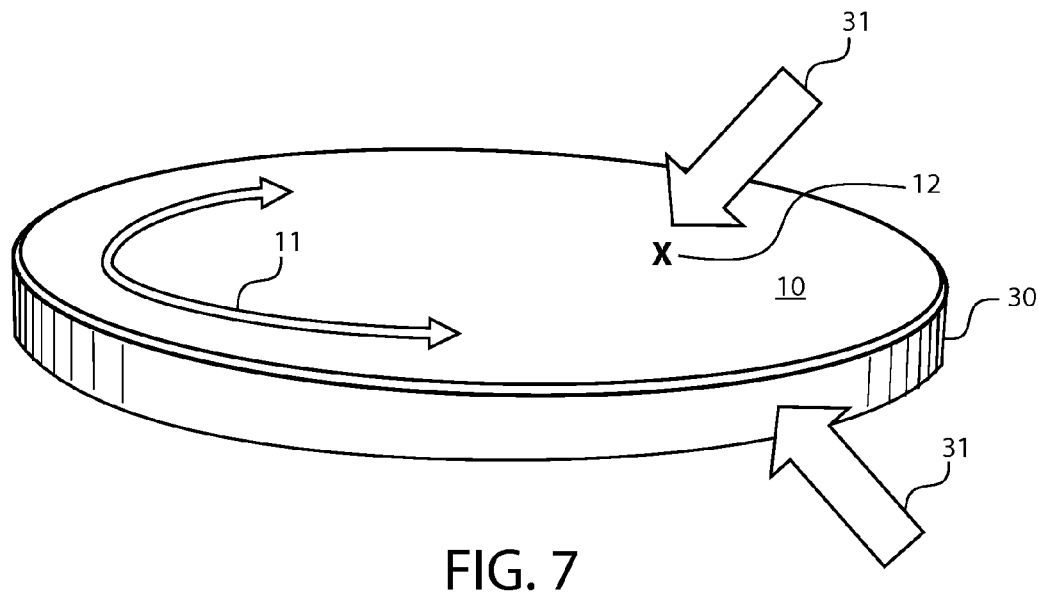
FIG. 7 is a perspective view of a rotatable member for a DJ audio playback device or DJ control surface of a further embodiment of the present invention, with position detection in the needle drop mode, and further with touch detection on the side thereof.

FIG. 7 is a perspective view similar to the plan view of FIG. 5. However, FIG. 7 further illustrates that the side 30 of rotatable member can be detect the manual touch 31 of the disc jockey.

Figure 8:
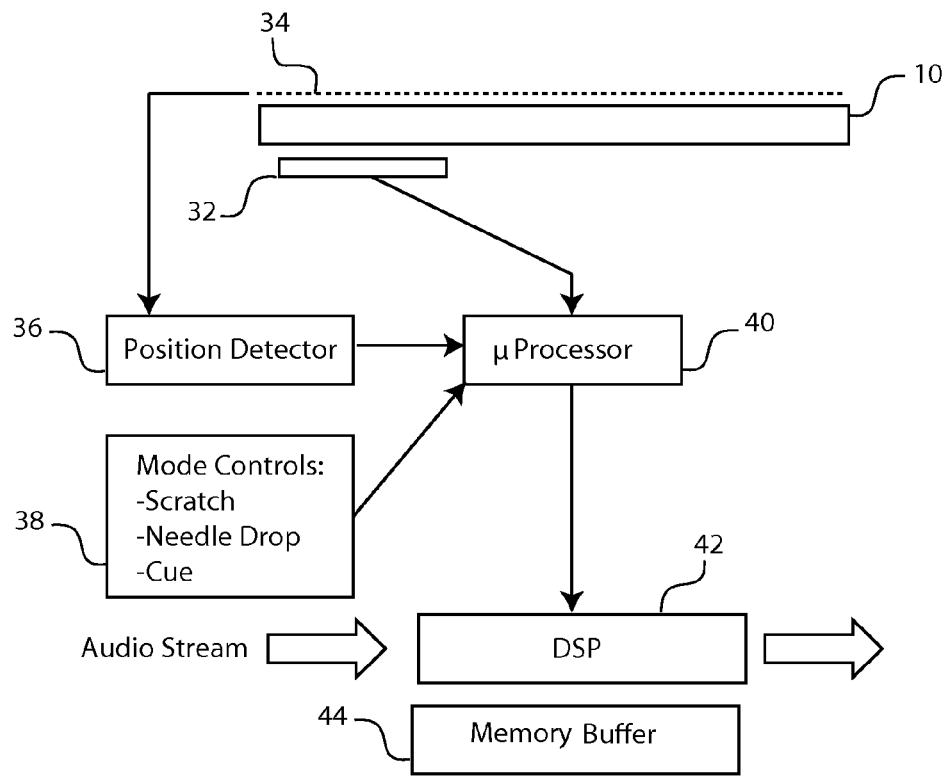
FIG. 8 is a block diagram of the electronics of a typical embodiment of the present invention.

FIG. 8 is a block diagram illustrating an embodiment of the electronics. The rotatable member 10 has (or, for some components, is closely associated and in communication with) a direction and velocity sensor 32, a capacitive touch sensing grid 34, position detection circuitry 36, mode controls 38, a microprocessor 40, a digital signal processor 42 and memory buffer 44. The velocity and direction sensor 32 is typically a quadrature optical detector which reads a pattern embedded on the member bottom surface. The quadrature information is sent to ports on the microcontroller 40. The capacitive sensing grid 34 operates as described previously, the output of the sensing grid 34 sends clock and data signals to the microprocessor 40 via position sensor 36. The mode controls 38 allow the user to switch between several modes of operation. The state of these mode switches are likewise read by the microprocessor 40. These modes of operation typically include scratch mode, needle drop mode, cue mode and dual scratch/needle drop mode or dual scratch/cue mode. In scratch mode, the position information is ignored by the processor and the surface works like a conventional DJ rotatable member. The DJ simply places his or her hand anywhere on the top surface, and turns the member 10 back and forth to implement a scratch effect. In needle drop mode, the position information is received by the microprocessor 40. The microprocessor sends this information to the digital signal processor 42. The digital signal processor calculates the memory location of the audio at that position indicated by the DJ's finger on the rotatable member and starts playing the music, as received by the input audio stream and stored in the memory buffer 44, immediately from that position.

In cue mode, the DJ touches a specific position of the rotatable member 10 in order to create cue points 26 (reference points in the musical performance). In cue mode, the microprocessor 40 reads the position information from the position detector 36. The position within the music is calculated by the DSP 42 and stored in an array in memory. This position can also be instantly displayed on a numeric display for reference. In dual mode, part of the surface is allocated for scratching and part of the surface is allocated for either cueing or needle dropping. The musical performance is remapped from the entire surface, to only the portion of the surface allocated for needle dropping or cueing. The microprocessor 40 processes position information from that portion of the surface, but ignores the position information from the portion of the surface used for scratching. In this embodiment, audio processing is performed by a DSP 42 and control processing by a general purpose microprocessor 40. Other embodiments may use a single processor to accomplish both tasks.

Figure 9:
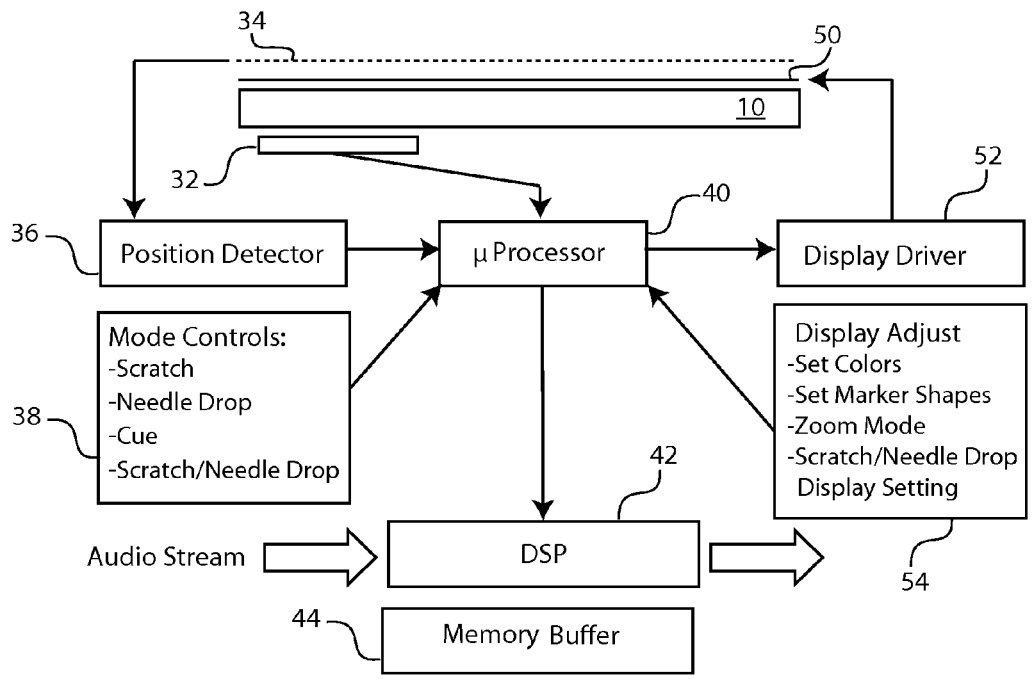
FIG. 9 is a block diagram of the electronics of a typical embodiment of the present invention, wherein a display is implemented.

FIG. 9 shows an embodiment using a touch sensitive display. In this embodiment, the display is a high resolution color LCD display 50 with a transparent capacitive sensing overlay 34. In this embodiment, the microprocessor 40 sends information to the display driver 52 based on input from the user's touching of the rotatable member surface, the state of the mode control switches 38 and the state of the display adjustment controls 54.

Figure 10:
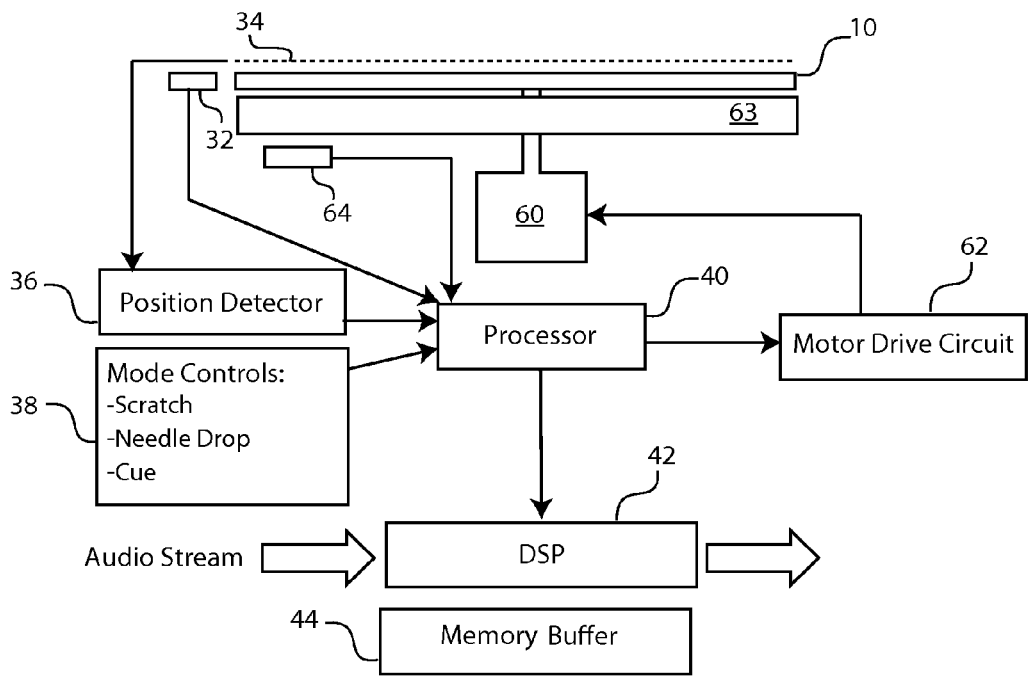
FIG. 10 is a block diagram of the electronics of a typical embodiment of the present invention, wherein a motorized platter in combination with a user manipulable rotatable member is implemented.

FIG. 10 is a block diagram of a embodiment that uses a motorized platter 63 coupled with the rotatable member 10. Platter 63 is driven by motor 60 as controlled by motor drive circuit 62, that may include a platter velocity sensor 64, in turn controlled by microprocessor 40. It is often desirable to have a DJ control device that rotates like a real turntable surface. Adding the above described functionality creates a control surface that mimics needle dropping of a real phonographic turntable.

Further effects can be achieved as shown in FIGS. 11-15.

Figure 11:
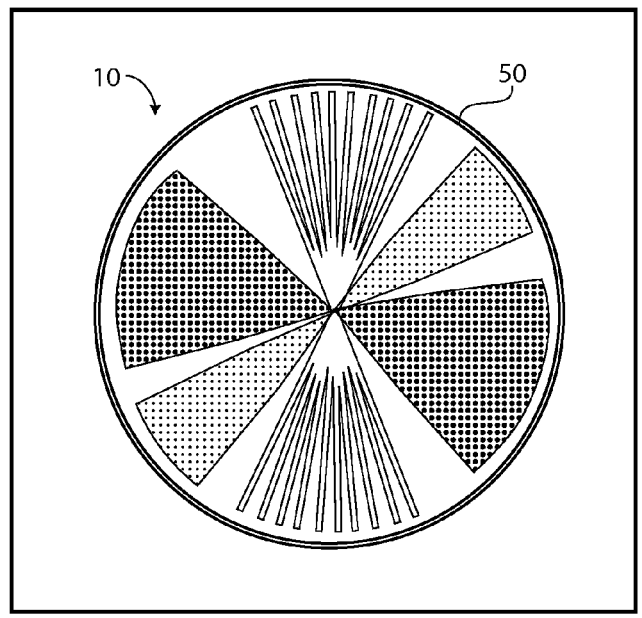
FIG. 11 is a plan view of a display for lighting effects in the scratch mode in an embodiment of the present invention.

FIG. 11 shows the LCD display 50 in scratch mode used to produce visual lighting effects. With this embodiment, the lighting effects are produced on a the surface of the member 10 and can change dynamically because they are displayed on an LCD video display 50. The lighting effects can include patterns, images, and text and can be beat synchronized to the music.

FIG. 12 shows the use of an external display 64 to show song information. This external display can be integrated into a DJ audio device which incorporates the previously described embodiments. In the case of an embodiment wherein the control surface is connected to a computer, the external display 64 can be a typical computer display.

Figure 13:
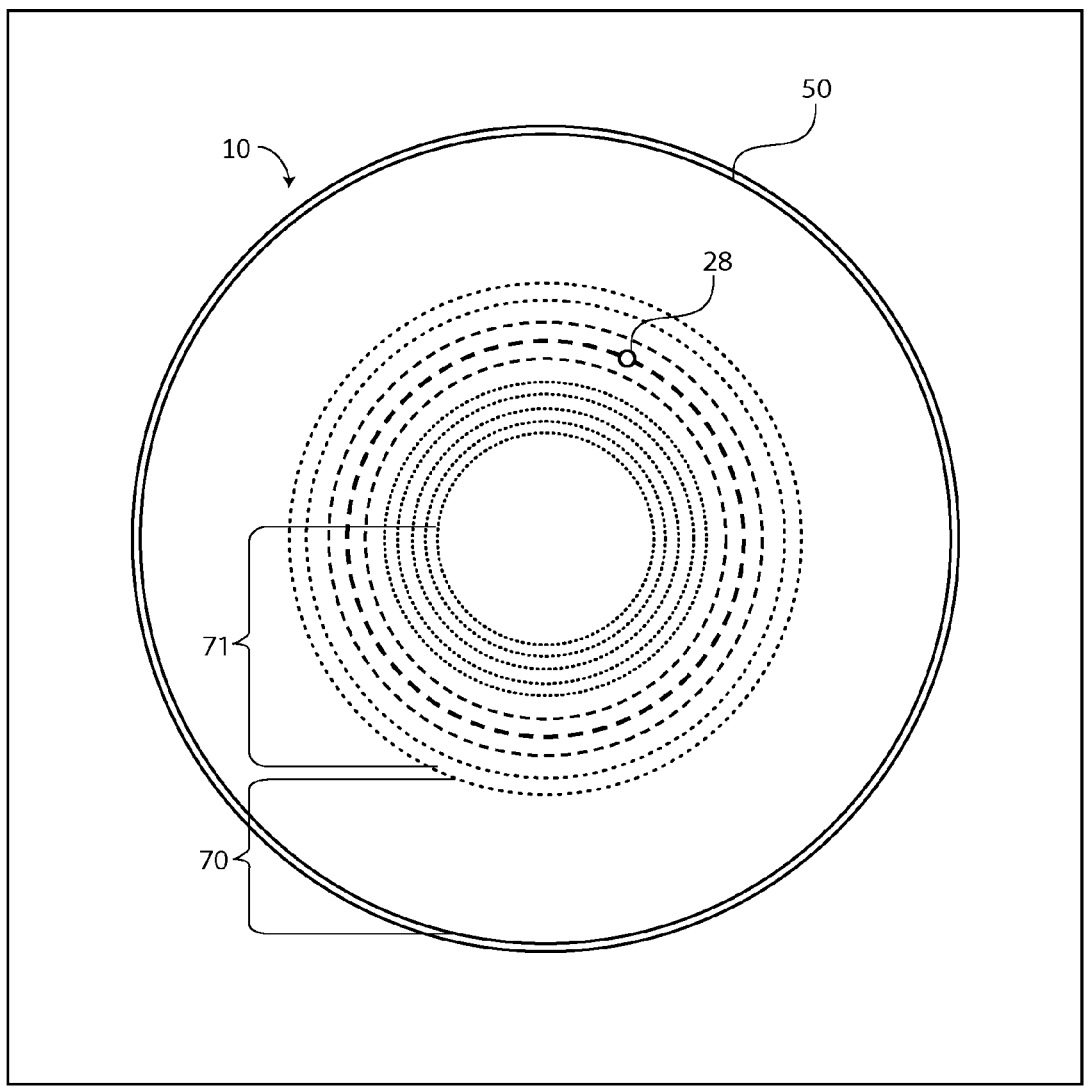
FIG. 13 is a plan view of the surface operating in a dual needle drop and scratch mode with display in an embodiment of the present invention.

FIG. 13 shows the display and control surface 50 mapped for dual mode operation. In this example, the inner portion of the surface 71 is used for needle dropping or setting cue points 26 and the outer part of the surface 70 is used for scratching. Based on the surface mapping for dual mode in the microprocessor's memory, the microprocessor 40 will instruct the display driver to display the appropriate visual pattern (again, see FIG. 13). Surface mapping of which portion of the surface will be used for needle dropping and which portion will be used for scratching can be set by the user either on the unit itself or with a remote computer. The microprocessor 40 instruct the display 50 to adjust to any changes.

Figure 14:
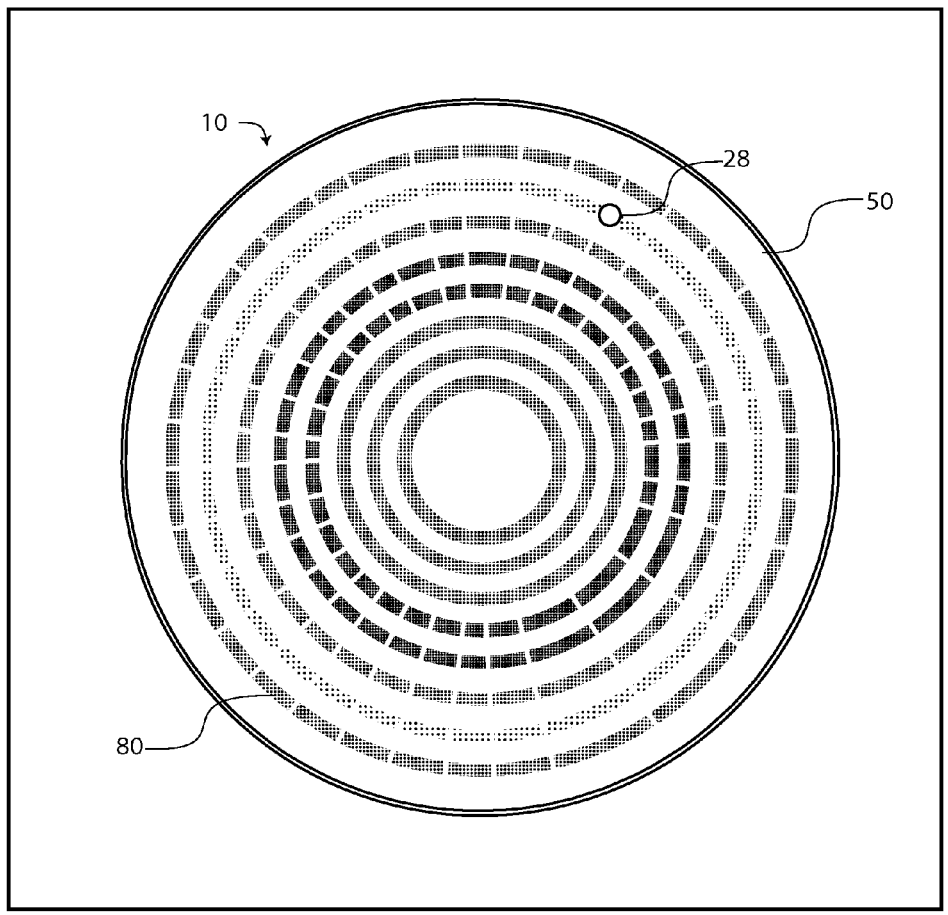
FIG. 14 is a plan view of the surface operating in a zoom mode with display in an embodiment of the present invention.

It is often desirable to get a finer level of control. Zoom mode allows the DJ to have control over how much music is mapped on to the member surface. For example the DJ may map several songs, one song or even a portion of the song onto the entire control surface. FIG. 14 shows a typical mapping in zoom mode. In this mode, the display the music beat 80 or tempo on the surface. The DSP 42 determines the music tempo by any of a number of ways that are well known to those skilled in the art.

Figure 15:
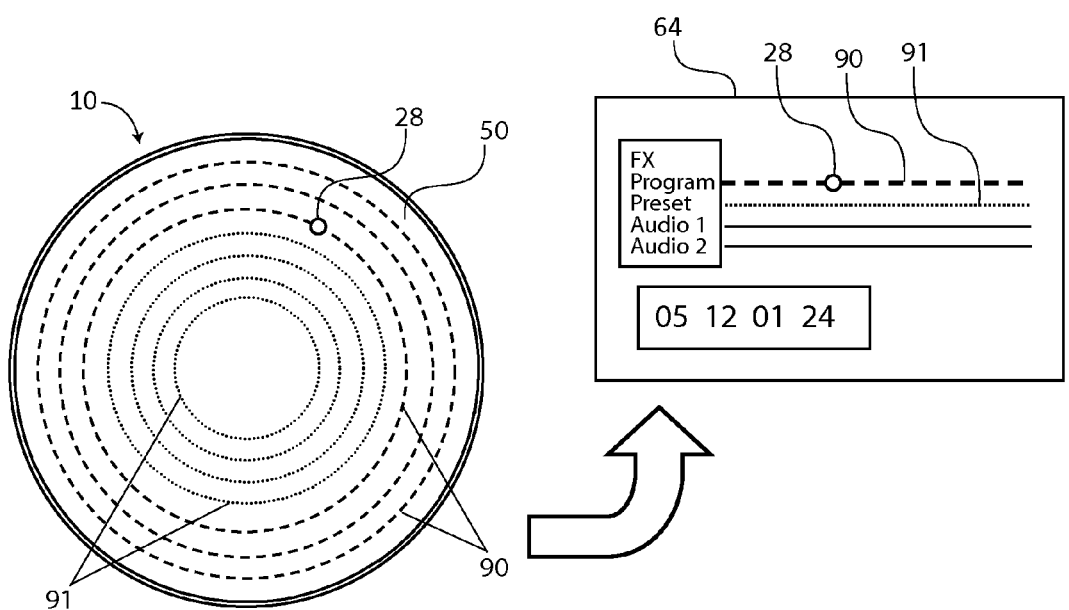
FIG. 15 is a plan view of the surface for an embodiment of the present invention for video disc jockeys.
Figure 16:
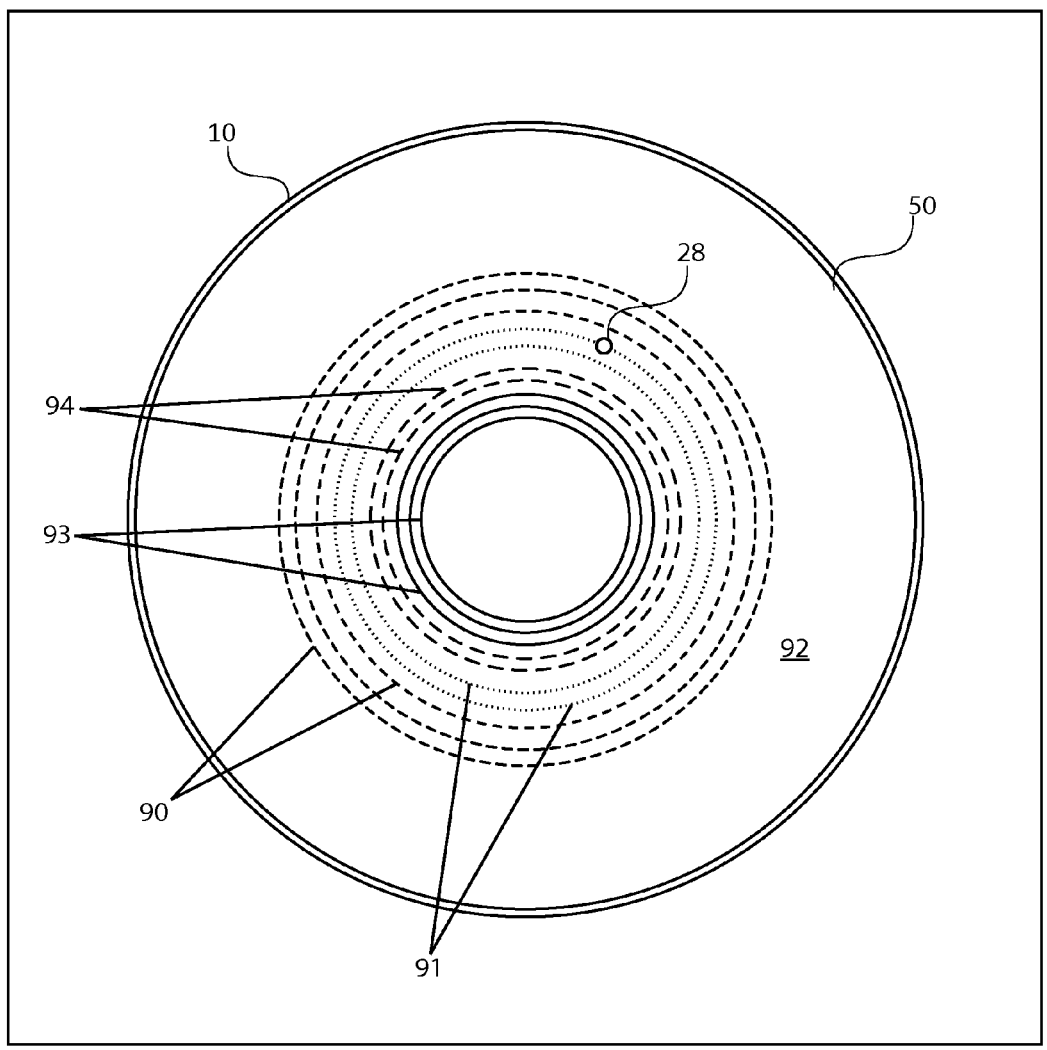
FIG. 16 is a further plan view of the surfaces for an embodiment of the present invention for video disc jockeys with display information coded to screen information.

Finally, these embodiments are not only applied to music DJing but also to Video DJing or VJs. FIGS. 15 and 16 show an embodiment for video DJing. The music "grooves" are now replaced by video tracks. The tracks are color coded. Traditionally, video is edited with a program track (or "A" roll), a preset track (or "B" roll) and an effect track (FX track). FIG. 15 shows the program 90 and preset tracks 91 mapped to different parts of the surface. These symbols and color coding can be linked to either an information display located on the unit or on an external computer display. A cut effect is when video abruptly changes from one scene to the next. A cut can be performed in a mode analogous to needle dropping where the VJ simply places his or her finger on the position of the video where they want to cut.

FIG. 16 shows surface mapping for multi-mode operation. Here, portions of the surface, and the corresponding display information, can be mapped for various functions. In this embodiment, the outer portion is allocated to video scrubbing 92, which is analogous to audio scratching. The inner portion shows all three video tracks, including the FX track 94, and the current audio track 93. This allows for a combination of both audio and video control on the same control surface. In a multi-media application, the control surface rotatable member could be used to seamlessly select and align both audio and video tracks.

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A control device for manipulating digital audio information, comprising:
   a user manipulable rotatable member;
   a sensing device coupled to a surface of said member for detecting a position on the surface of said member touched by the user;
   a sensor coupled to said member for detecting direction and relative position of rotation of said member; and
   processing means for manipulating a portion of an audio track to be played based on a position touched by the user on said member; and
   processing means for manipulating the digital audio information based on the detected direction and the relative position of rotation of said member.

2. A device of claim 1 further comprising:
   a rotating platter impinging against said rotatable member and rotating about a common axis therewith; and
   a motor driving said rotating platter.

3. A device of claim 1 wherein the processor dynamically maps which portion of a musical performance can be manipulated by said member surface.

4. A device of claim 1 wherein said processing means maps a portion of said member surface where position can be detected and maps a portion of said member surface where position information is ignored.

5. A device of claim 1 wherein said sensing device for detecting position is a capacitive position sensing array.

6. A device of claim 1 wherein said sensing device for detecting position is a resistive position sensing array.

7. A device of claim 1 wherein said sensing device for detecting position is an orthogonal array of infra-red image sensors.

8. A device of claim 1 wherein a portion of said processing means is included in an externally connected device.

9. A device of claim 8 wherein said externally connected device is a computer.

10. A control device for manipulating digital audio information, comprising:
    user manipulable rotatable member;
    a touch screen display coupled to the top surface of said member;
    said touch screen detects the position where the top surface of said member was touched;
    a sensor coupled to said member for detecting direction and relative position of rotation of said member;
    processing means for manipulating a portion of the audio track to be played based on the position touched by the user on said member; and
    processing means for manipulating the digital audio information based on the detected direction and the relative position of rotation of said member.

11. A device of claim 10 wherein said touch screen displays concentric rings that represent portions of a musical performance.

12. A device of claim 10 wherein said touch screen displays at least one marking that represents a current position of the music.

13. A device of claim 10 wherein said touch screen displays markings that represent song start and stop positions.

14. A device of claim 10 wherein said touch screen displays markings that represent cue points.

15. A device of claim 10 wherein said touch screen displays markings that are color coded to correspond to a display on an externally connected computer.

16. A device of claim 10 wherein said touch screen displays markings that are color coded to correspond to an information display contained within the device.

17. A device of claim 10 wherein said processing means maps a portion of said member surface where position can be detected and maps a portion of said member surface where position information is ignored.

18. A device of claim 17 wherein said touch screen displays information corresponding to the portion of said member surface where position is detected and the portion of member surface where position is ignored.

19. A device of claim 10 wherein said touch screen display dynamically displays images, text, or patterns that correspond to the music tempo.

20. A device of claim 10 further comprising:
    a rotating platter impinging against said rotatable member and rotating about a common axis therewith; and
    a motor driving said rotating platter.

21. A device of claim 1 wherein manipulating a portion of the audio track to be played based on the position touched by the user on said member includes a needle drop function.

22. A device of claim 1 wherein processing means for manipulating a portion of the audio track to be played based on a position touched by the user on said member includes memory; and
    manipulating a portion of the audio track to be played based on the position touched by the user on said member includes creating cue points in memory based on the position touched by the user on said member.

23. A device of claim 1 wherein manipulating the digital audio information based on the detected direction and the relative position of rotation results in a scratch effect.

24. A device of claim 1 wherein the sensor coupled to said member for detecting direction and relative position of rotation is a quadrature optical detector.

25. A device of claim 1 further including means for selectively responding to either the position touched by the user on said member or the detected direction and the relative position of rotation of said member.

26. A device of claim 10 wherein manipulating a portion of the audio track to be played based on the position touched by the user on said member includes a needle drop function.

27. A device of claim 10 wherein processing means for manipulating a portion of the audio track to be played based on a position touched by the user on said member includes memory; and manipulating a portion of the audio track to be played based on the position touched by the user on said member includes creating cue points in memory based on the position touched by the user on said member.

28. A device of claim 10 wherein manipulating the digital audio information based on the detected direction and the relative position of rotation results in a scratch effect.

29. A device of claim 10 wherein the sensor coupled to said member for detecting direction and relative position of rotation is a quadrature optical detector.

30. A device of claim 10 further including means for selectively responding to either the position touched by the user on said member or the detected direction and the relative position of rotation of said member.

* * * * *